US011923630B2

(12) United States Patent
Hsiao et al.

(10) Patent No.: US 11,923,630 B2
(45) Date of Patent: Mar. 5, 2024

(54) ELECTRICAL CONNECTOR ASSEMBLY INCLUDING AN INTERNAL CIRCUIT BOARD HAVING THREE ROWS OF CONDUCTIVE PADS RESPECTIVELY AT THREE END PORTIONS THEREOF

(71) Applicants: FU DING PRECISION INDUSTRIAL (ZHENGZHOU) CO., LTD., Zhengzhou (CN); FOXCONN INTERCONNECT TECHNOLOGY LIMITED, Grand Cayman (KY)

(72) Inventors: Shih-Wei Hsiao, New Taipei (TW); Yu-San Hsiao, New Taipei (TW); Yen-Chih Chang, New Taipei (TW); Yu-Ke Chen, Kunshan (CN); Na Yang, Kunshan (CN); Wei-Hua Zhang, Kunshan (CN)

(73) Assignees: FUDING PRECISION INDUSTRY (ZHENGZHOU) CO., LTD., Zhengzhou (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 150 days.

(21) Appl. No.: 17/516,695

(22) Filed: Nov. 2, 2021

(65) Prior Publication Data

US 2022/0140513 A1 May 5, 2022

(30) Foreign Application Priority Data

Nov. 2, 2020 (CN) ......................... 202011202421.4
Nov. 2, 2020 (CN) ......................... 202011203220.6
Nov. 2, 2020 (CN) ......................... 202022490224.9

(51) Int. Cl.
*H01R 12/71* (2011.01)
*H01R 12/72* (2011.01)
*H01R 12/73* (2011.01)
*H01R 13/514* (2006.01)

(52) U.S. Cl.
CPC ......... *H01R 12/716* (2013.01); *H01R 12/721* (2013.01); *H01R 12/737* (2013.01); *H01R 13/514* (2013.01)

(58) Field of Classification Search
CPC .. H01R 12/716; H01R 12/721; H01R 12/737; H01R 13/514
USPC ........................................................... 439/74
See application file for complete search history.

(56) References Cited

U.S. PATENT DOCUMENTS 4,703,394 A * 10/1987 Petit .................... H01R 12/737 361/803
6,540,522 B2 * 4/2003 Sipe .................. H01R 13/6658 439/607.05
6,623,310 B1 * 9/2003 Billman .............. H01R 13/514 439/701

(Continued)

*Primary Examiner* — Peter G Leigh
(74) *Attorney, Agent, or Firm* — Ming Chieh Chang

(57) ABSTRACT

An electrical connector assembly includes: a bracket; and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB, wherein the PCB has a third row of conductive pads disposed at a rear end portion thereof.

19 Claims, 15 Drawing Sheets

(56) References Cited

U.S. PATENT DOCUMENTS

| | | | | |
|---|---|---|---|---|
| 6,638,079 | B1 * | 10/2003 | Billman | H01R 13/6587 439/79 |
| 6,645,009 | B1 * | 11/2003 | Billman | H01R 13/6471 439/108 |
| 6,705,895 | B2 * | 3/2004 | Hasircoglu | H01R 11/05 439/108 |
| 6,884,117 | B2 * | 4/2005 | Korsunsky | H01R 13/6585 439/607.11 |
| 7,044,793 | B2 * | 5/2006 | Takemasa | H01R 12/52 439/607.07 |
| 7,742,291 | B2 * | 6/2010 | Wu | G06F 1/186 361/679.32 |
| 7,993,147 | B2 * | 8/2011 | Cole | H01R 13/6473 439/79 |
| 9,537,239 | B1 * | 1/2017 | Liu | H01R 13/6587 |
| 10,020,603 | B1 | 7/2018 | Amphenol | |
| 10,276,985 | B1 | 4/2019 | Amphenol | |
| 10,505,302 | B2 * | 12/2019 | Watanabe | H01R 12/737 |
| 10,693,249 | B2 * | 6/2020 | Toh | H01R 13/6587 |
| 2004/0185715 | A1 * | 9/2004 | Kimura | H01R 12/7064 439/607.05 |

* cited by examiner

ELECTRICAL CONNECTOR ASSEMBLY INCLUDING AN INTERNAL CIRCUIT BOARD HAVING THREE ROWS OF CONDUCTIVE PADS RESPECTIVELY AT THREE END PORTIONS THEREOF

BACKGROUND OF THE INVENTION

1. Field of the Invention

The present invention relates to an electrical connector assembly comprising a bracket and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB.

2. Description of Related Arts

U.S. Pat. No. 10,020,603 discloses an electrical connector assembly comprising a bracket and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB.

SUMMARY OF THE INVENTION

An electrical connector assembly comprises: a bracket; and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB, wherein the PCB has a third row of conductive pads disposed at a rear end portion thereof. Alternatively, an electrical connector assembly comprises: a bracket including a main body and a pair of legs; and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB, wherein the main body has at least one slot receiving an associated plug-in connector and the pair of legs and a bottom of the main body define a space accommodating respective board-mount connector of the at least one transmission assembly.

DETAILED DESCRIPTION OF THE PREFERRED EMBODIMENTS

Figure 1:
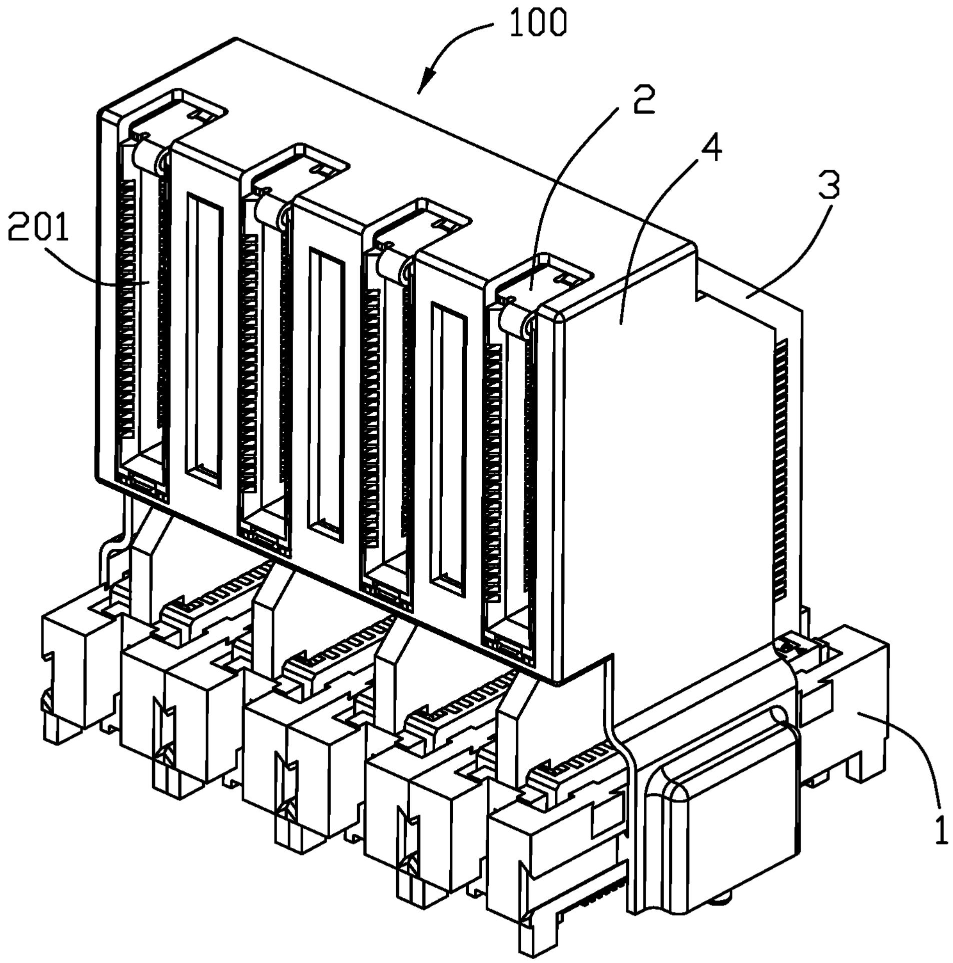
FIG. 1 is a perspective view of an electrical connector assembly in accordance with the present invention.
Figure 2:
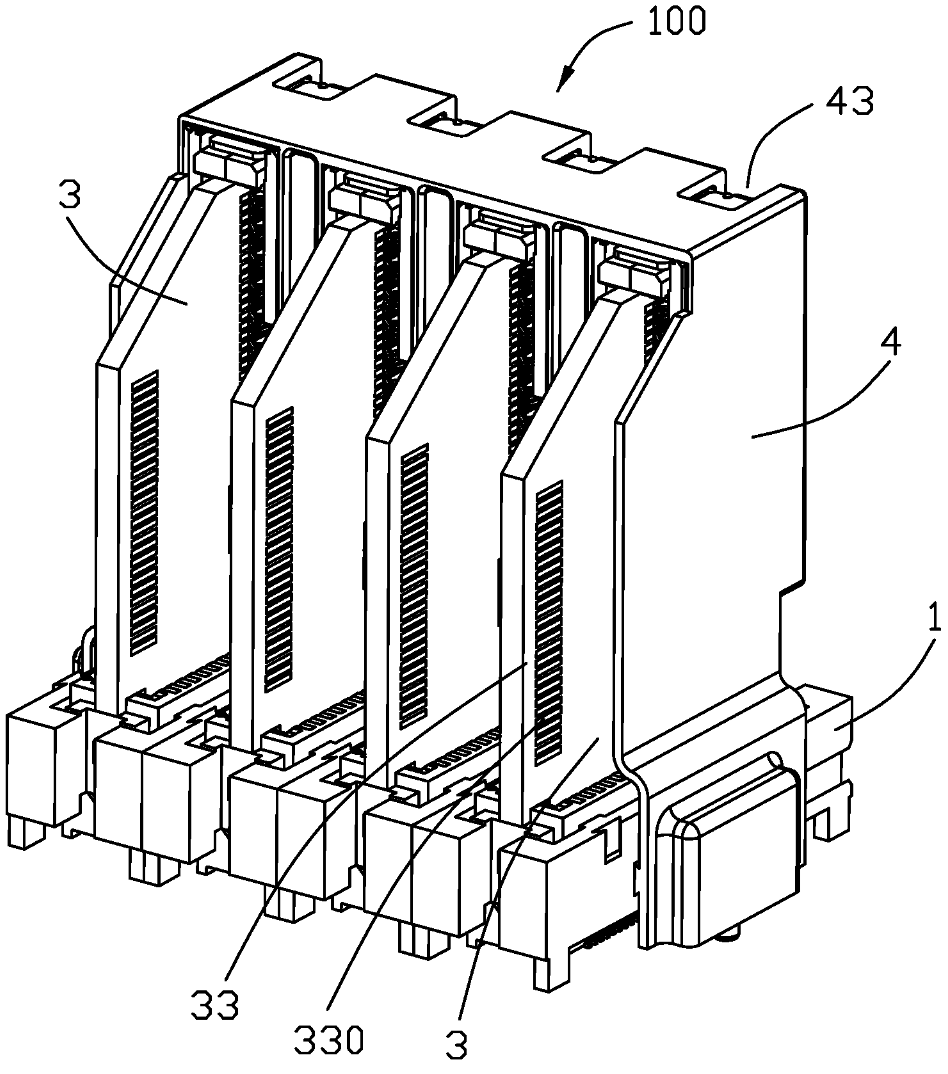
FIG. 2 is another perspective view of the electrical connector assembly.
Figure 3:
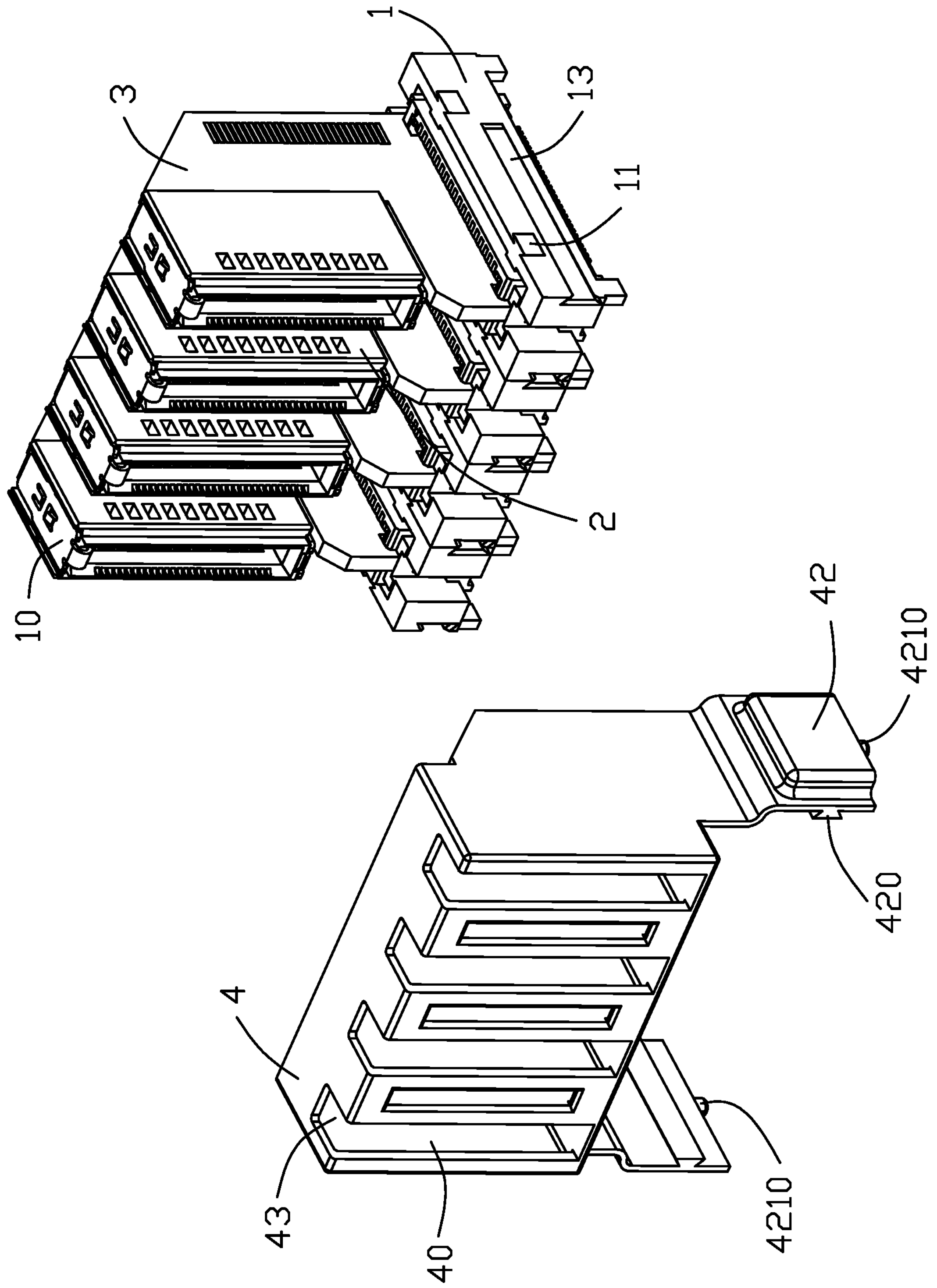
FIG. 3 is an exploded view of the electrical connector assembly.
Figure 4:
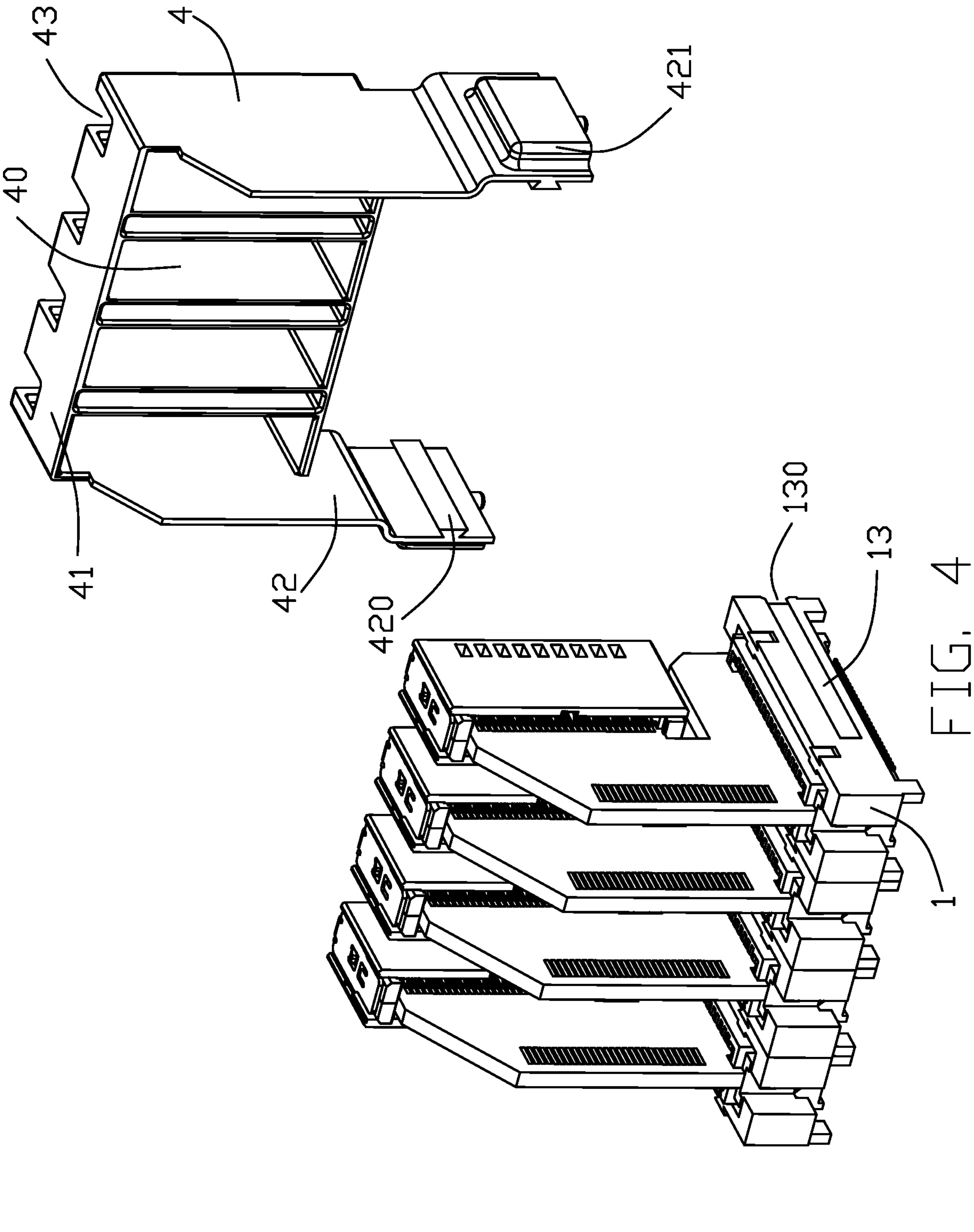
FIG. 4 is another exploded view of the electrical connector assembly.

Referring to FIGS. 1-11, an electrical connector assembly 100 comprises a bracket 4 and one or more transmission assemblies 10 mounted to the bracket 4. Each transmission assembly 10 includes an internal printed circuit board (PCB) 3, a board-mount connector 1 connected to a first row of conductive pads 310 disposed at a bottom end portion 31 of the PCB 3, and a plug-in connector 2 connected to a second row of conductive pads 320 disposed at a front end portion 32 of the PCB 3. The PCB 3 provides electrical connection between the board-mount connector 1 and the plug-in connector 2. The first conductive pads row 311 and the second conductive pads row 321 are arranged in directions perpendicular to each other. The PCB 3 further has a third row of conductive pads 330 disposed at a rear end portion 33 thereof for connection via a cable or a cable end connector to an external device in any suitable known manner. The first conductive pads row 311 and the third conductive pads row 331 are also arranged in directions perpendicular to each other. Depending on specific applications, the third row of conductive pads 330 may be in electrical connection through conductive traces with selected ones of the second row of conductive pads 320 and even with selected ones of the first row of conductive pads 310 or, if desired, with electronic components or circuitry on the PCB 3.

Figure 5:
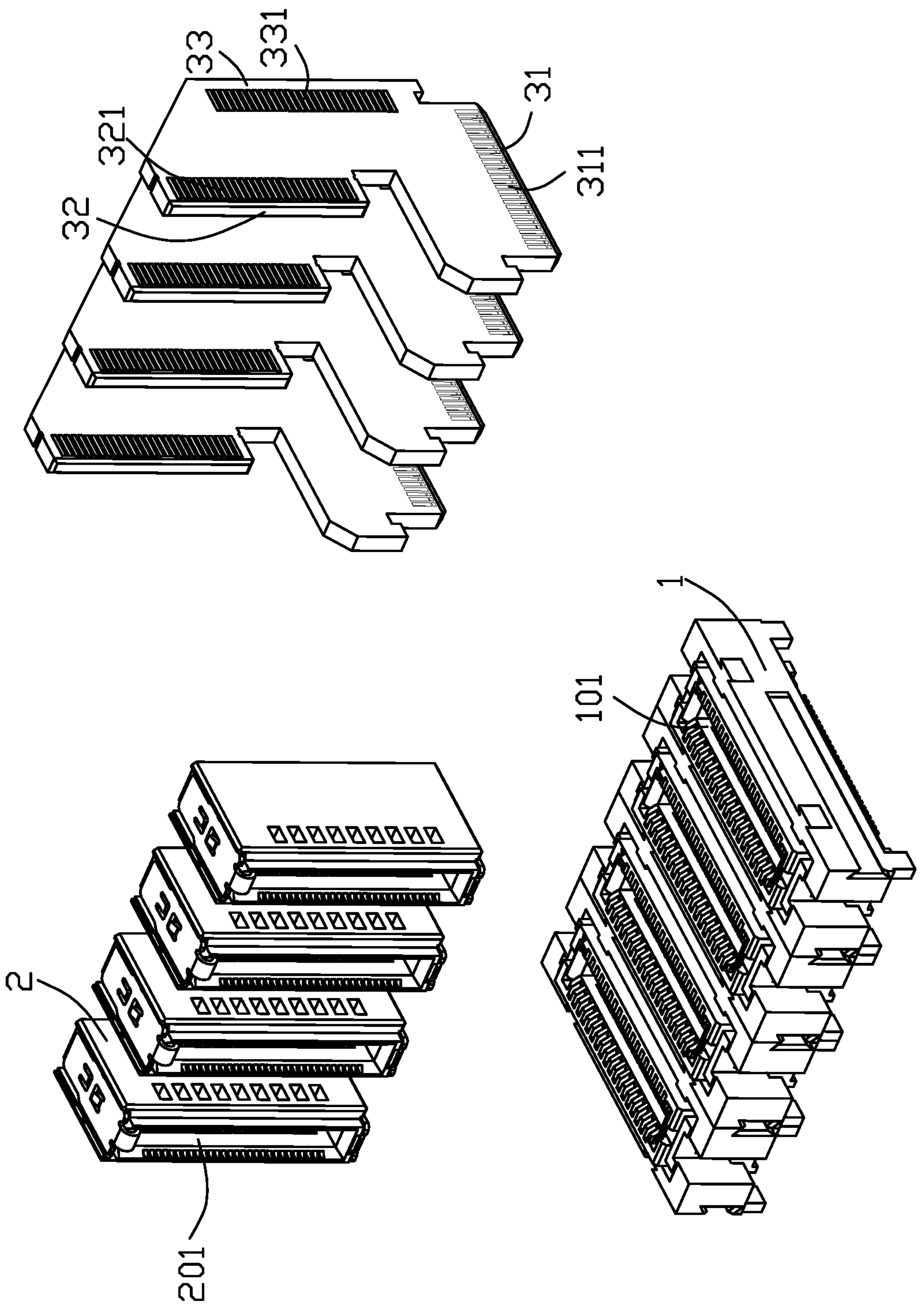
FIG. 5 is a further exploded view of the electrical connector in FIG. 3.
Figure 6:
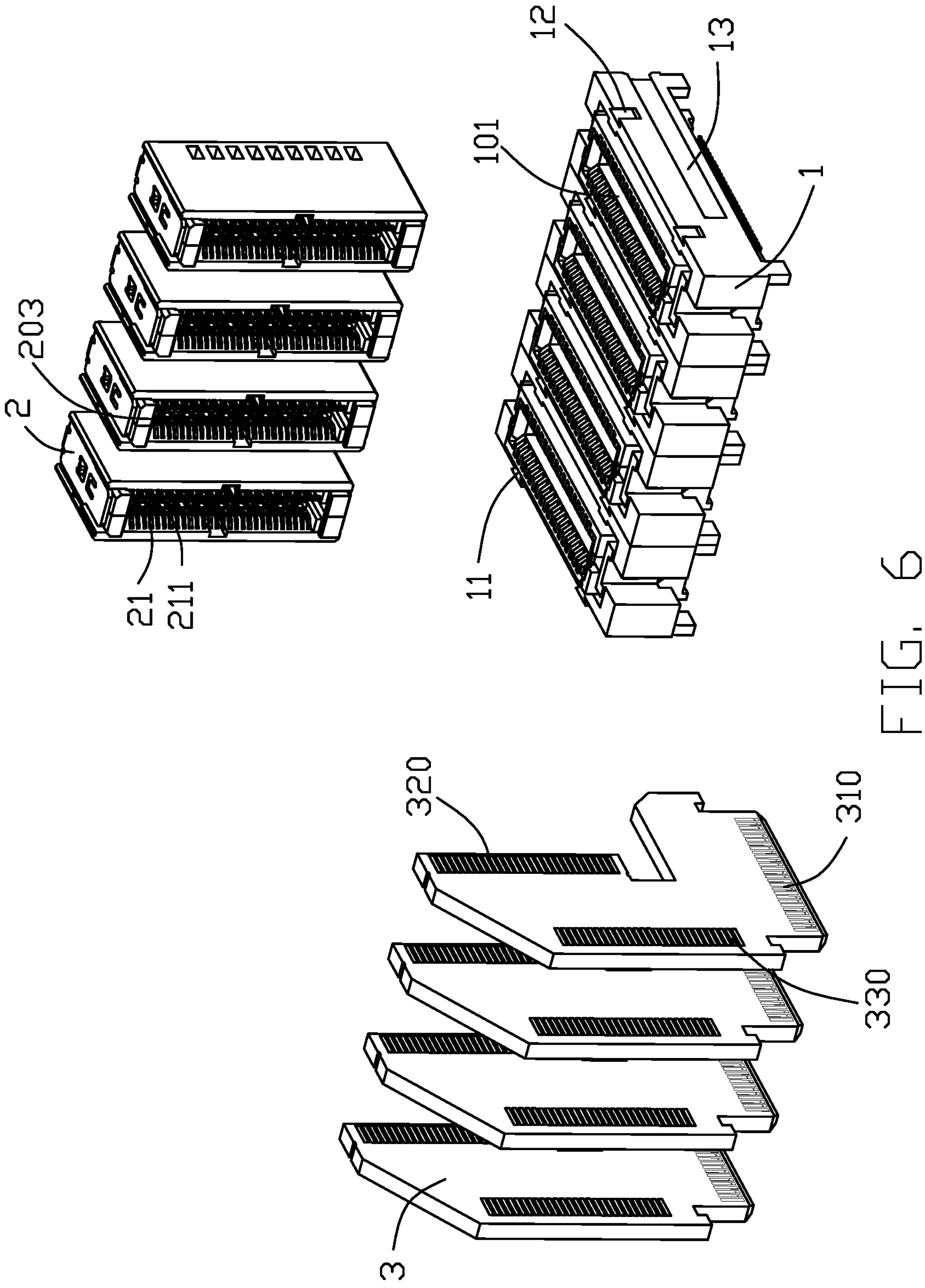
FIG. 6 is a further exploded view of the electrical connector in FIG. 4.
Figure 7:
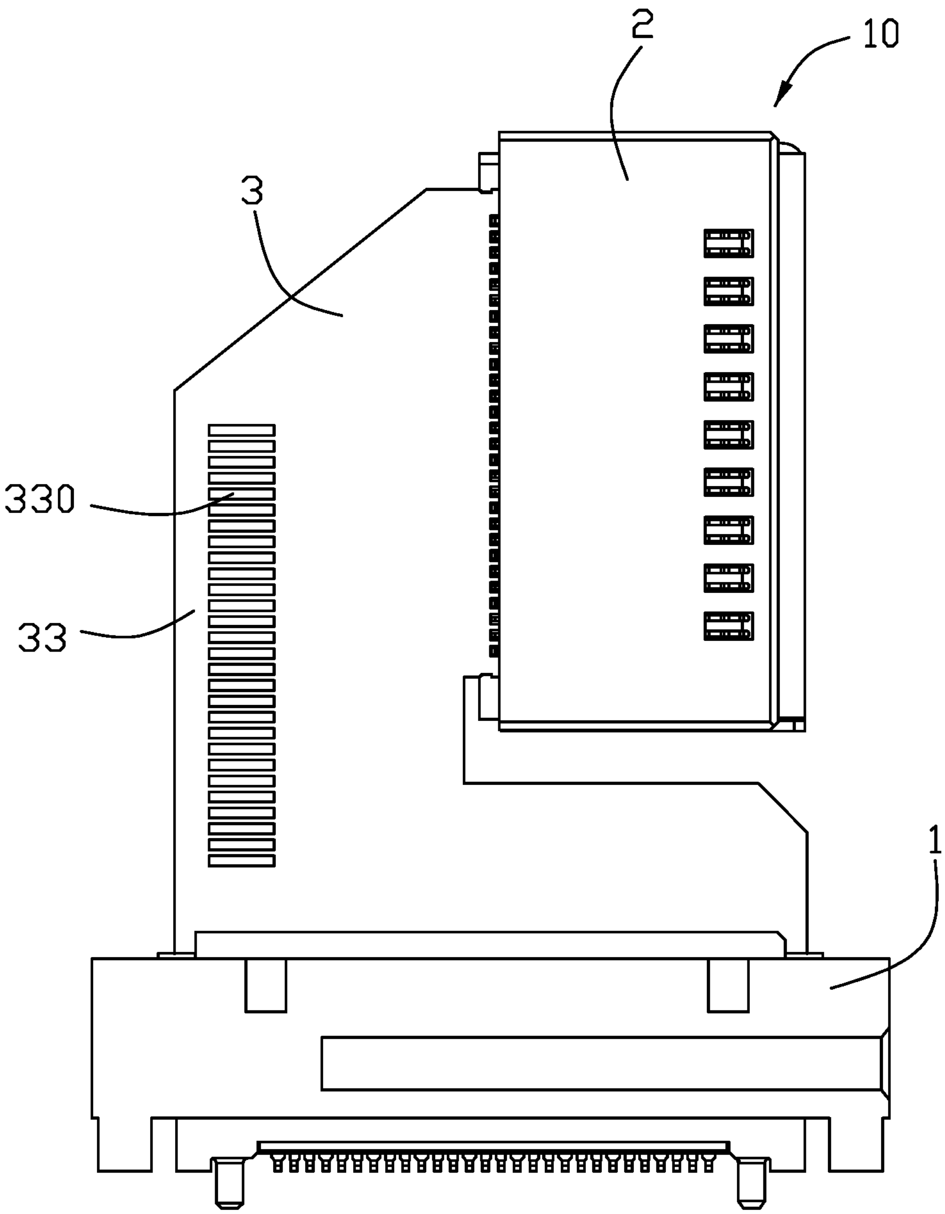
FIG. 7 is a side view of the electrical connector assembly.

Referring specifically to FIGS. 5 and 6, the rear end portion 33 is parallel to the front end portion 32. The PCB 3 is vertically oriented and configured so that the first row of conductive pads 311 are arranged along a front-to-rear direction and the second row of conductive pads 321 are located rearward behind a frontmost conductive pad of the first row of conductive pads 311. Also, both the second and third rows of conductive pads 321 and 331 are arranged along a top-to-bottom direction and a topmost conductive pad of the third row of conductive pads 331 is located lower than a topmost conductive pad of the second row of conductive pads 321. Moreover, both the second and third rows of conductive pads 321 and 331 are arranged along the top-to-bottom direction so that a bottommost conductive pad of the third row of conductive pads 331 is located lower than a bottommost conductive pad of the second row of conductive pads 321. The plug-in connector 2 is located rearward behind a frontmost portion of the board-mount connector 1, as clearly seen in FIG. 7. This efficient use of the PCB 3 reduces a size of the electrical connector assembly 100.

The board-mount connector 1 has a mating port 101 facing upward; the plug-in connector 2 has a mating port 201 facing forward and a mating port 203 facing rearward. The bottom end portion 31 with the first row of conductive pads 310 enters the mating port 101; the front end portion 32 with the second row of conductive pads 320 enters the mating port 203.

In the application of four transmission assemblies 10 as shown, each board-mount connector 1 has a pair of protrusions 11 on one side thereof and a pair of grooves 12 on the other side thereof so that adjacent board-mount connectors 1 may be interlocked through such dove-tailed structures.

Referring specifically to FIGS. 1-4, the bracket 4 has a main body 41 and a pair of legs 42. The main body 41 has one or more slots 40. Each slot 40 receives an associated plug-in connector 2. The pair of legs 42 and a bottom of the main body define a space for accommodating respective board-mount connectors 1. Each leg 42 has a protrusion 420 and an associated board-mount connector 1 has a groove 13 with a front opening 130 for receiving the protrusion 420. Each leg 42 has a thickened portion 421 with a mounting post 4210.

Figure 8:
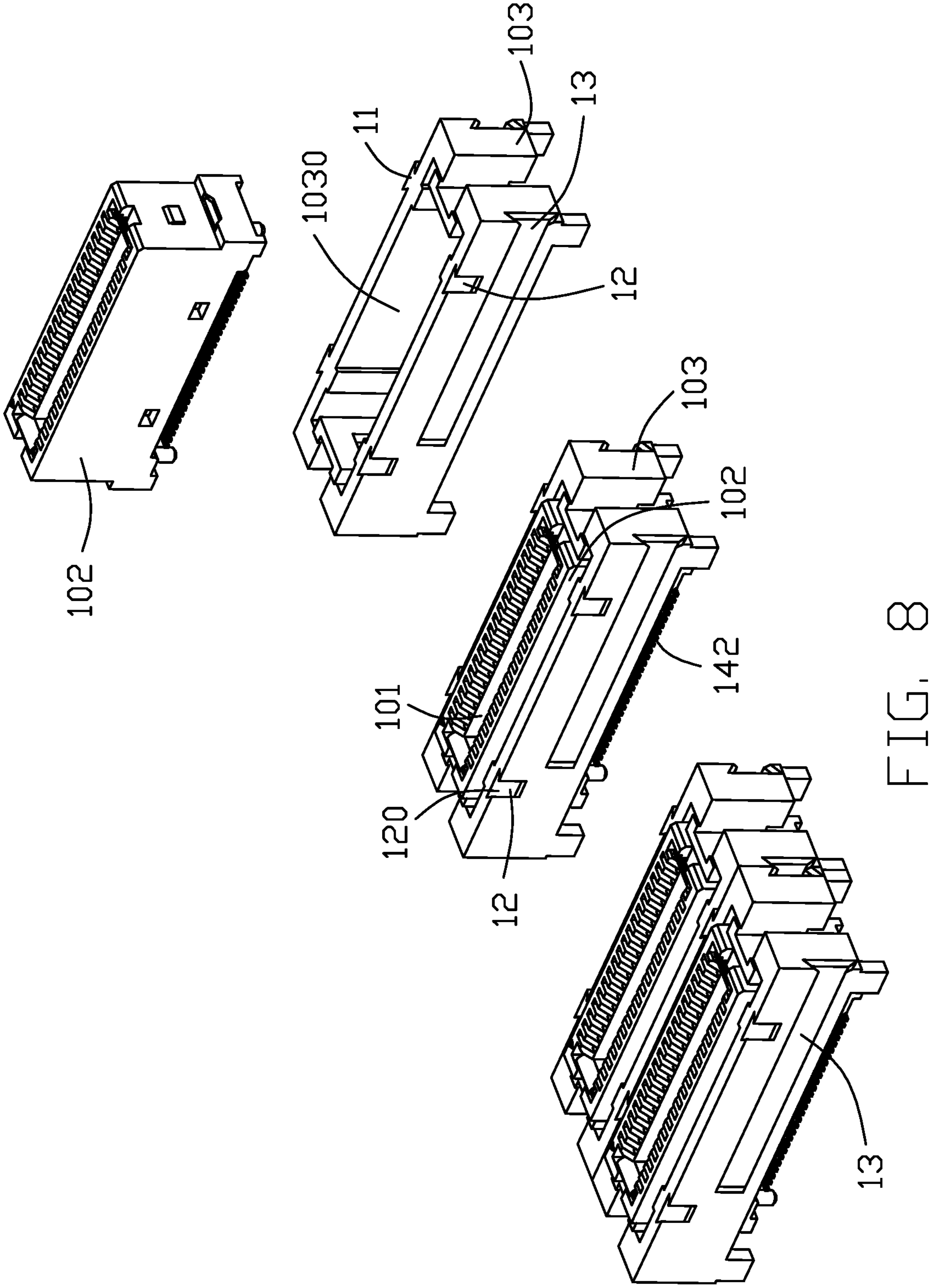
FIG. 8 is a still further exploded view showing a part of the electrical connector assembly in FIG. 6.
Figure 9:
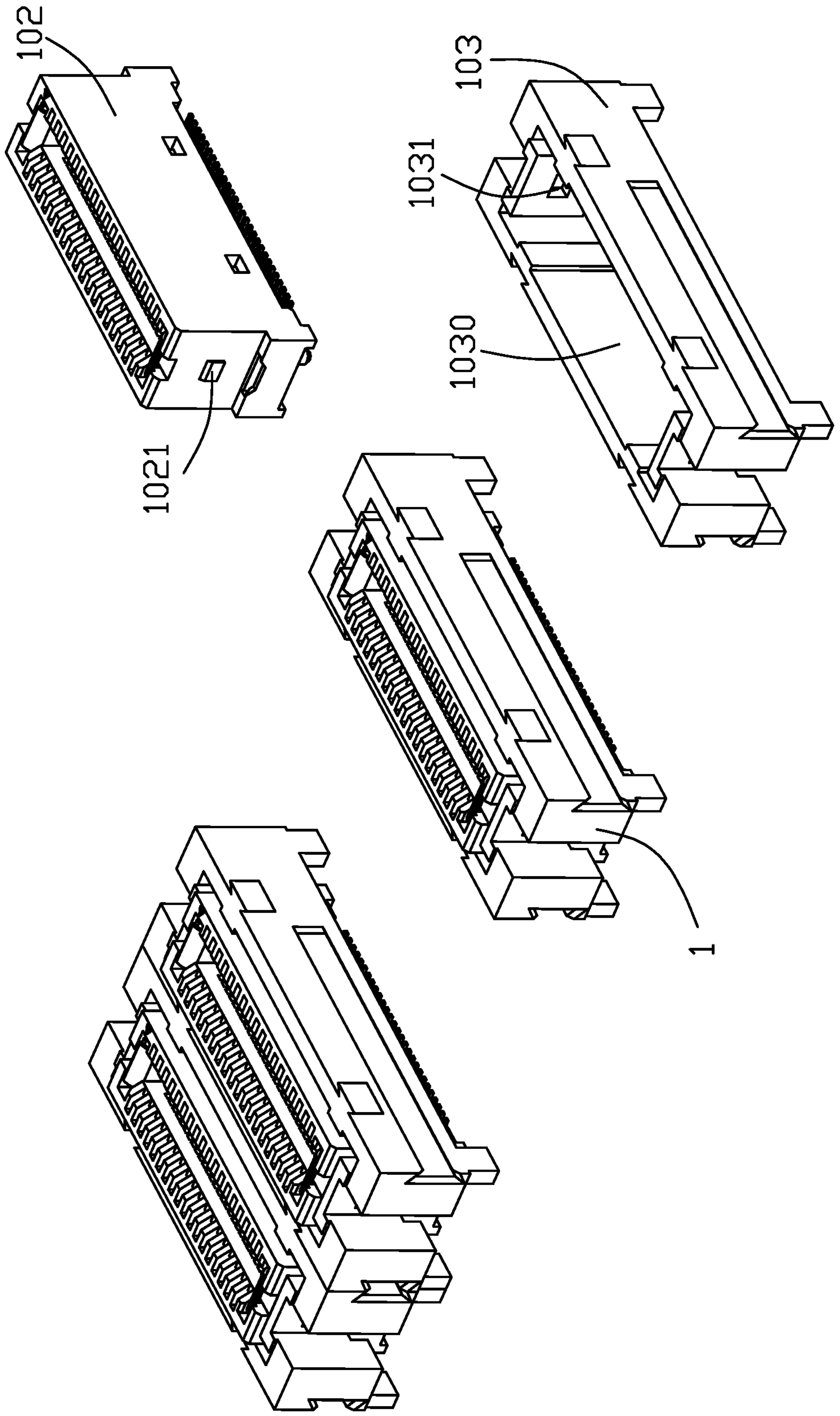
FIG. 9 is a view similar to FIG. 8 but from a different perspective.
Figure 10:
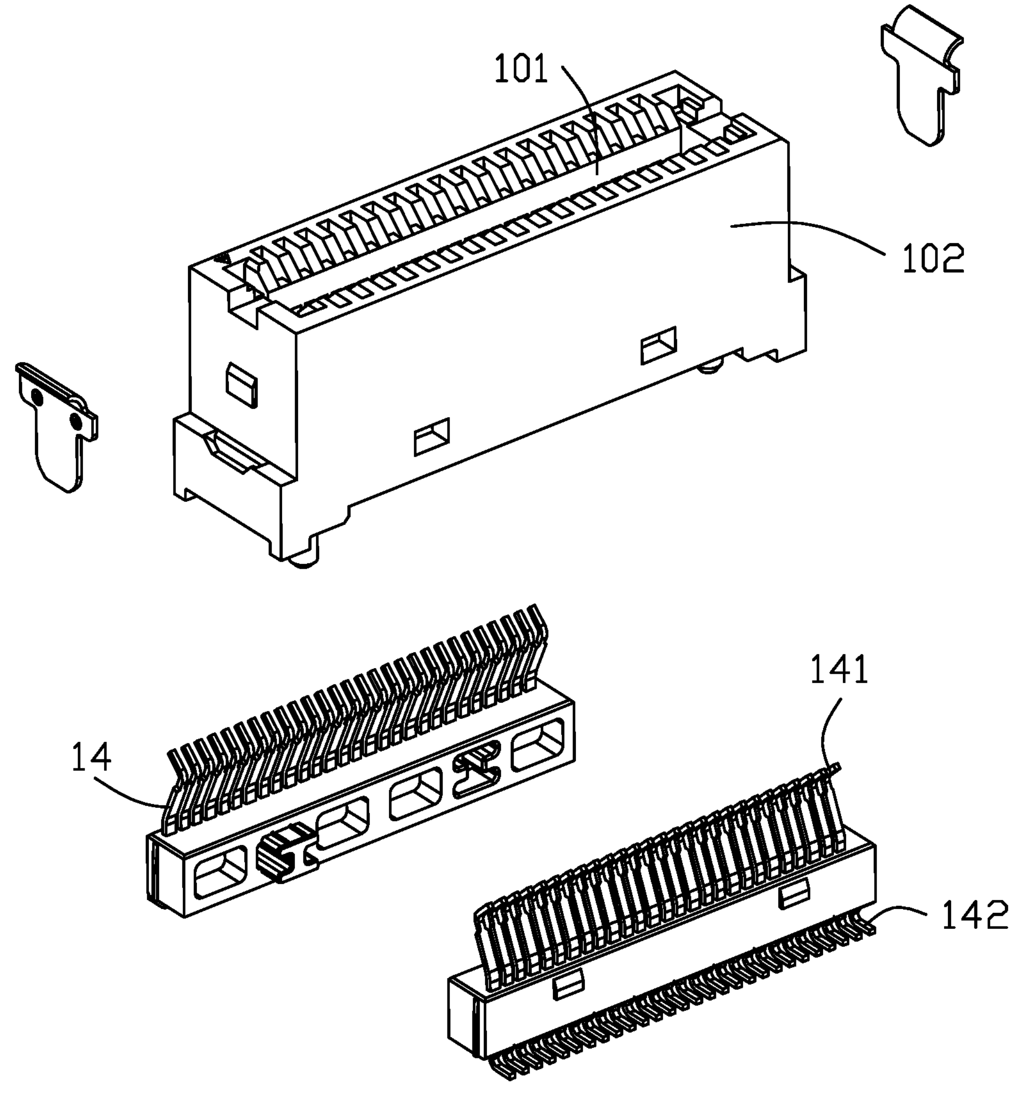
FIG. 10 is a further exploded view of FIG. 9 in part.

Referring specifically to FIGS. 8 and 9, the board-mount connector 1 has an insulative base 102, a plurality of contacts 14 secured in the insulative base 102, and a shroud 103 enclosing the insulative base 102. Each contact 14 has a contacting portion 141 for mating a corresponding conductive pad 310 and a tail 142 for mounting to a host board to which the electrical connector assembly 100 is mounted. The shroud 103 has a receiving part 1030 and a pair of openings 1031 at two opposite end walls thereof; the insulative base 102 has a pair of protrusions engaging the openings 1031.

Figure 11:
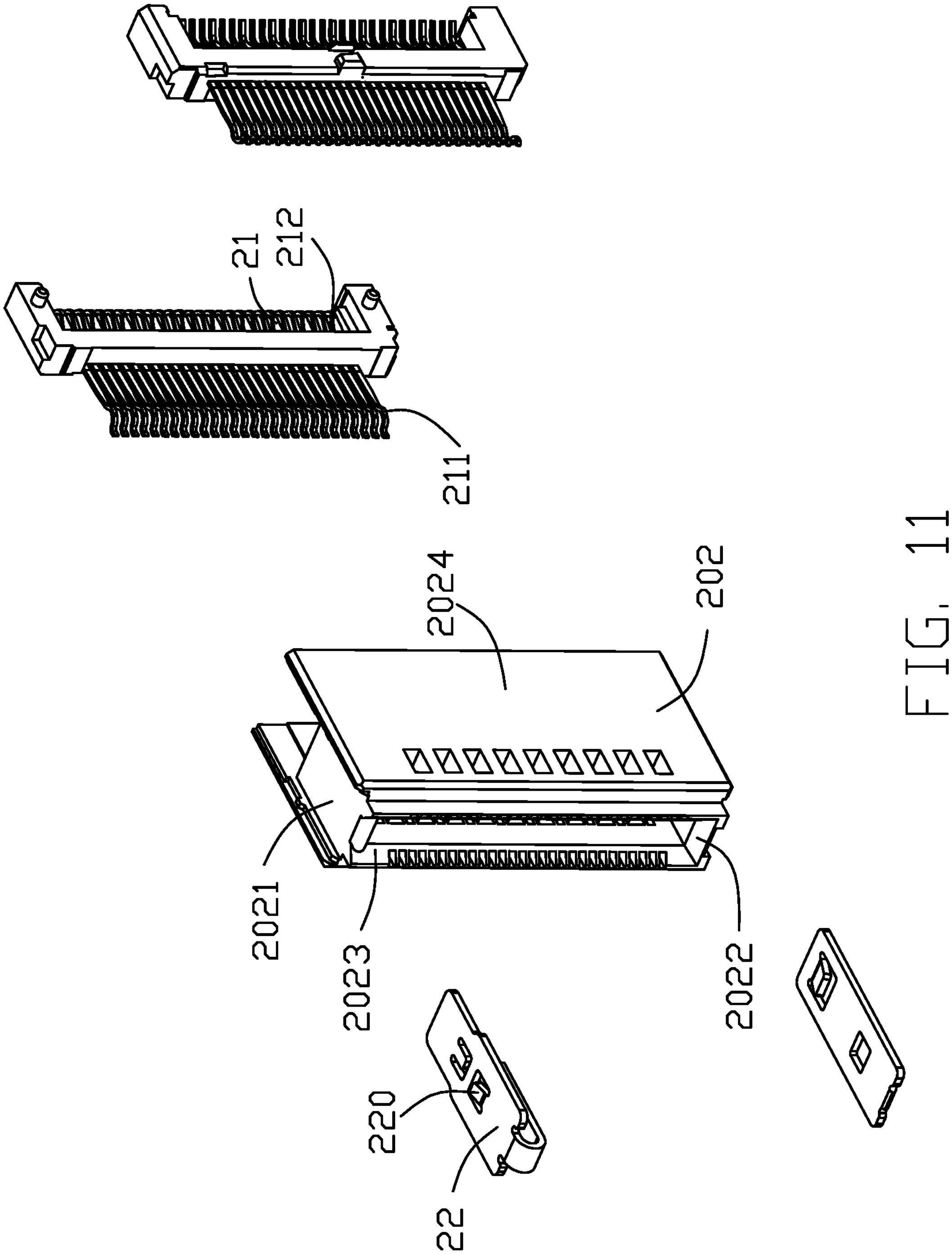
FIG. 11 is a still further exploded view showing another part of the electrical connector assembly in FIG. 6.
Figure 12:
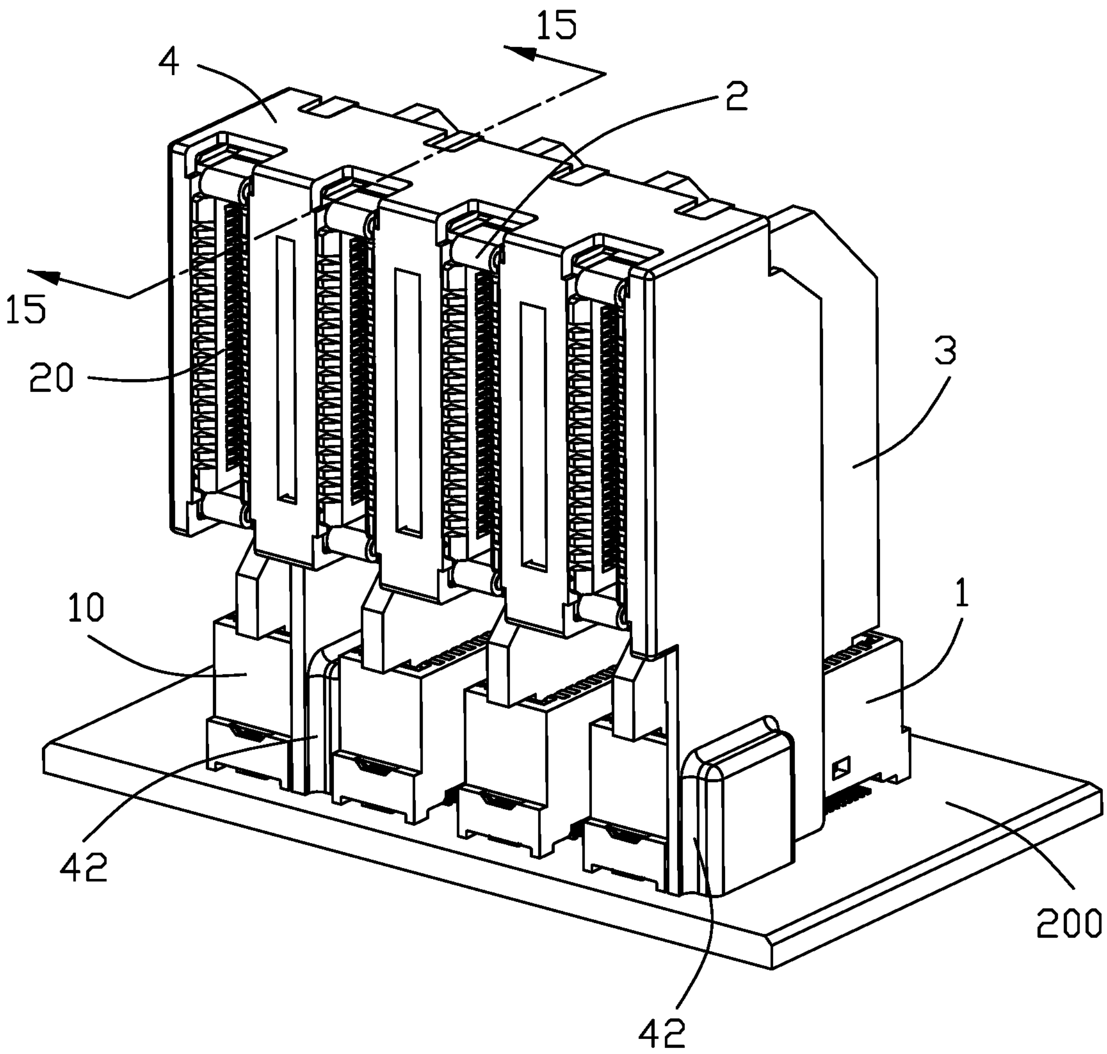
FIG. 12 is a perspective view of a varied electrical connector assembly in accordance with the present invention.

Referring specifically to FIG. 11, the plug-in connector 2 has an insulative base 202 and a plurality of contacts 21 secured in the insulative base 202. The insulative base 202 has two end walls 2021 and 2022 and two side walls 2023 and 2024. Each contact 21 has a front contacting portion 211 and a rear contacting portion 212 exposing to the front mating port 201 and the rear mating port 203, respectively. In conjunction with FIGS. 1 and 4, a respective clip 22 is mounted to each of the two end walls 2021 and 2022. The clip 22 has a finger 220. Each slot 40 of the bracket 4 has a notch 43 exposing a part of the clip 22. provided on the main body 41 of the bracket 4.

Figure 13:
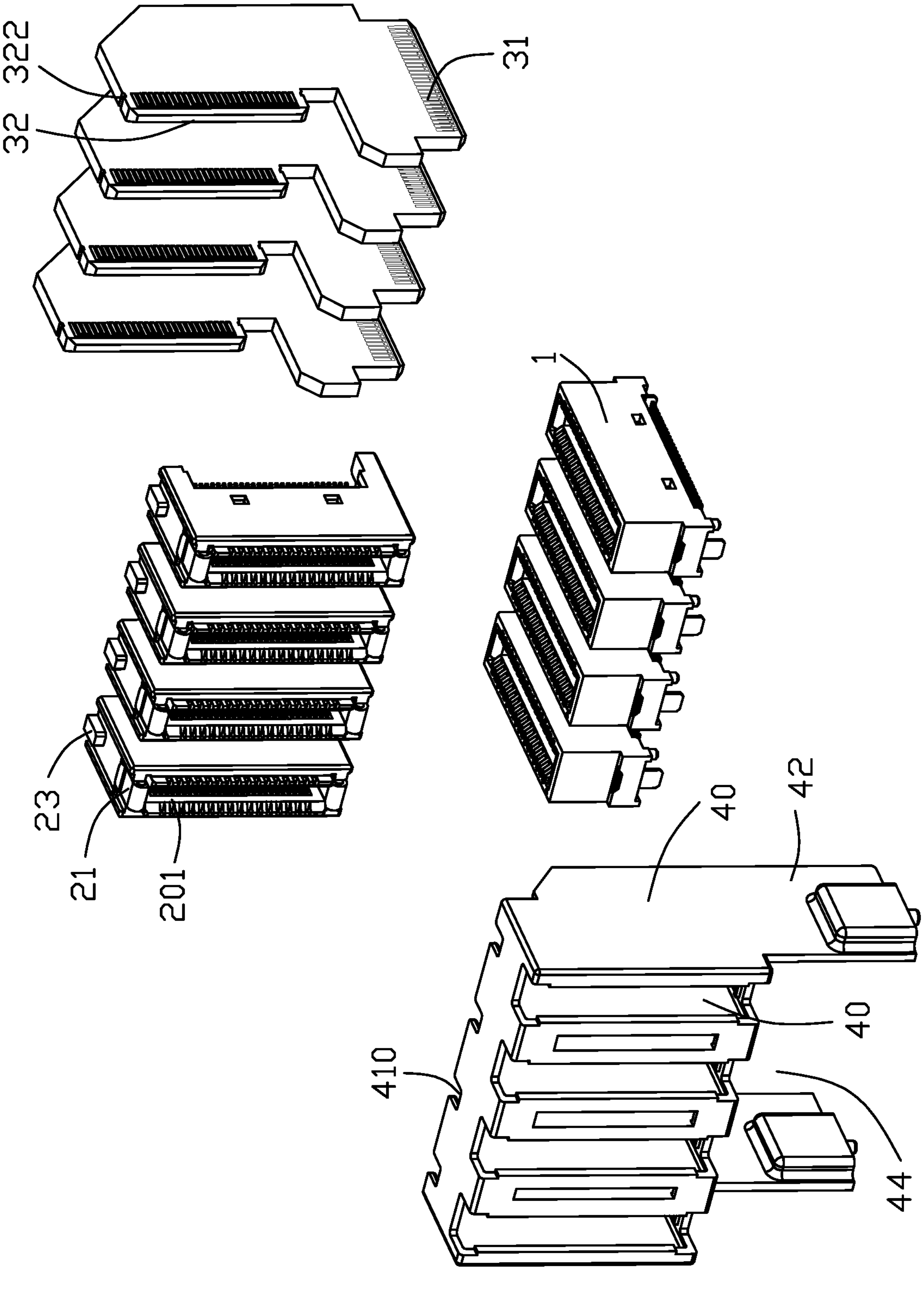
FIG. 13 is an exploded view of the varied electrical connector assembly.
Figure 14:
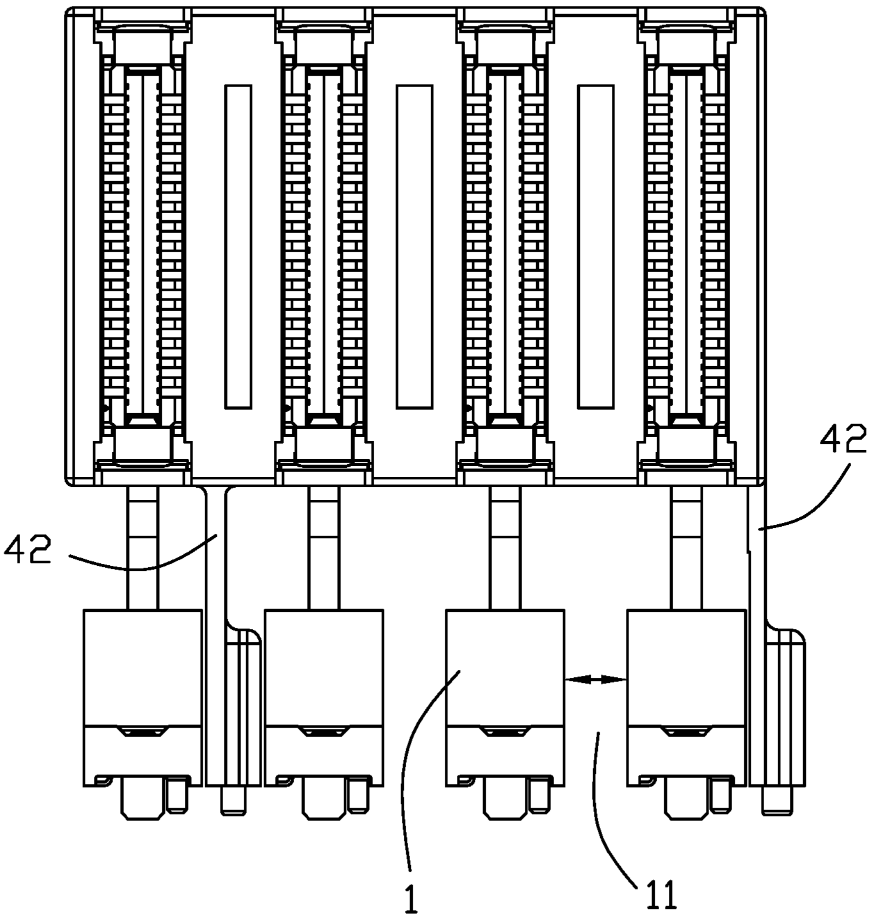
FIG. 14 is a further exploded view showing a part of the varied electrical connector assembly.
Figure 15:
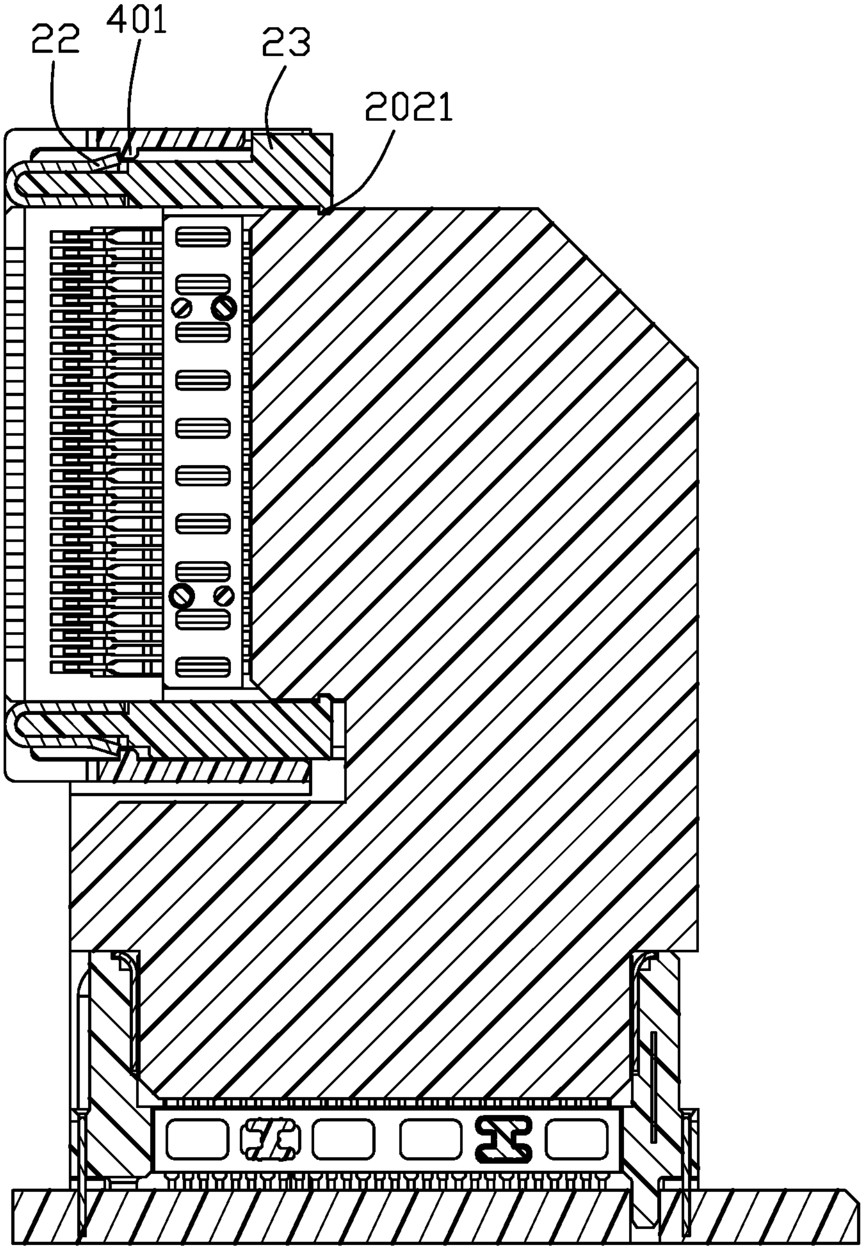
FIG. 15 is a cross-sectional view of the varied electrical connector taken along line A-A in FIG. 12.

FIGS. 12-15 show a varied electrical connector assembly mounted to a host board 200. The varied electrical connector assembly is different from the electrical connector assembly 100 primarily in that the internal PCB 3 does not have a corresponding third row of conductive pads, the board-mount connectors 1 are not side-by-side interlocked, and the bracket 4 has one leg 42 located between two corresponding board-mount connectors 1. Specifically, as shown in FIG. 14, two adjacent board-mount connectors 1 are spaced a distance 11 which is slightly greater than a width of the thickened portion 421 of the leg 42 so that the leg 42 is received in the space 11 instead of located at an outer side of the board-mount connectors 1 in order to save board space. Additionally, as shown in FIGS. 13 and 15, the PCB 3 has upper and lower notches 322 for engaging corresponding protrusions 202 formed on the plug-in connector 2; the plug-in connector 2 has a protrusion 23 for engaging a respective notch 410 formed on the bracket 4 while the clip 22 has a finger for engaging a stop 401 formed on the bracket 4.

What is claimed is:

1. An electrical connector assembly comprising:

a bracket; and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB; wherein the PCB has a third row of conductive pads disposed at a rear end portion thereof;

the board-mount connector has a mating port and the bottom end portion of the PCB enters the mating port; and the plug-in connector has a mating port and the front end portion of the PCB enters the mating port.

2. The electrical connector assembly as claimed in claim 1, wherein the first row of conductive pads are arranged along a front-to-rear direction and the second row of conductive pads are located rearward behind a front most conductive pad of the first row of conductive pads.

3. The electrical connector assembly as claimed in claim 1, wherein both the second and third rows of conductive pads are arranged along a top-to-bottom direction and a topmost conductive pad of the third row of conductive pads is located lower than a topmost conductive pad of the second row of conductive pads.

4. The electrical connector assembly as claimed in claim 1, wherein both the second and third rows of conductive pads are arranged along a top-to-bottom direction and a bottommost conductive pad of the third row of conductive pads is located lower than a bottommost conductive pad of the second row of conductive pads.

5. The electrical connector assembly as claimed in claim 1, wherein there are plural transmission assemblies, and the bracket includes a pair of legs secured to a corresponding pair of board-mount connectors, respectively.

6. The electrical connector assembly as claimed in claim 1, wherein there are plural transmission assemblies, and the bracket includes a leg located between two corresponding board-mount connectors.

7. The electrical connector assembly as claimed in claim 1, wherein there are plural transmission assemblies, and all the board-mount connectors are side-by-side interlocked together.

8. An electrical connector assembly comprising:

a bracket including a main body and a pair of legs; and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB; wherein the main body has at least one slot receiving an associated plug-in connector and the pair of legs and a bottom of the main body define a space accommodating respective board-mount connector of the at least one transmission assembly.

9. The electrical connector assembly as claimed in claim 8, wherein there are plural transmission assemblies, and the pair of legs are secured to a corresponding pair of board-mount connectors, respectively.

10. The electrical connector assembly as claimed in claim 8, wherein there are plural transmission assemblies, and one of the pair of legs is located between two corresponding board-mount connectors.

11. The electrical connector assembly as claimed in claim 8, wherein there are plural transmission assemblies, and all the board-mount connectors are side-by-side interlocked together.

12. The electrical connector assembly as claimed in claim 8, wherein the PCB has a third row of conductive pads disposed at a rear end portion thereof.

13. An electrical connector assembly comprising:

a bracket; and at least one transmission assembly mounted to the bracket and including an internal printed circuit board (PCB), a board-mount connector connected to a first row of conductive pads disposed at a bottom end portion of the PCB, and a plug-in connector connected to a second row of conductive pads disposed at a front end portion of the PCB; wherein the PCB has a third row of conductive pads disposed at a rear end portion thereof; and the plug-in connector is located rearward behind a frontmost portion of the board-mount connector.

14. The electrical connector assembly as claimed in claim 13, wherein the first row of conductive pads are arranged along a front-to-rear direction and the second row of conductive pads are located rearward behind a frontmost conductive pad of the first row of conductive pads.

15. The electrical connector assembly as claimed in claim 13, wherein both the second and third rows of conductive pads are arranged along a top-to-bottom direction and a topmost conductive pad of the third row of conductive pads is located lower than a topmost conductive pad of the second row of conductive pads.

16. The electrical connector assembly as claimed in claim 13, wherein both the second and third rows of conductive pads are arranged along a top-to-bottom direction and a bottommost conductive pad of the third row of conductive pads is located lower than a bottommost conductive pad of the second row of conductive pads.

17. The electrical connector assembly as claimed in claim 13, wherein there are plural transmission assemblies, and the bracket includes a pair of legs secured to a corresponding pair of board-mount connectors, respectively.

18. The electrical connector assembly as claimed in claim 13, wherein there are plural transmission assemblies, and the bracket includes a leg located between two corresponding board-mount connectors.

19. The electrical connector assembly as claimed in claim 13, wherein there are plural transmission assemblies, and all the board-mount connectors are side-by-side interlocked together.

* * * * *